(12) United States Patent
Yamauchi et al.

(10) Patent No.: US 8,007,133 B2
(45) Date of Patent: Aug. 30, 2011

(54) LIGHT SOURCE DEVICE AND PROJECTOR

(75) Inventors: Taisuke Yamauchi, Matsumoto (JP);
Takashi Takeda, Suwa (JP); Masayuki Takagi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 379 days.

(21) Appl. No.: 12/261,417

(22) Filed: Oct. 30, 2008

(65) Prior Publication Data

US 2009/0168424 A1    Jul. 2, 2009

(30) Foreign Application Priority Data

Dec. 28, 2007    (JP) .................................. 2007-339462

(51) Int. Cl.
*F21V 17/02*    (2006.01)
*F21V 14/06*    (2006.01)

(52) U.S. Cl. ....................... 362/277; 362/282

(58) Field of Classification Search .................. 362/277, 362/282

See application file for complete search history.

(56) References Cited

U.S. PATENT DOCUMENTS

| 6,377,336 | B1 * | 4/2002 | Shiraishi et al. | 355/67 |
| 6,951,411 | B1 * | 10/2005 | Kumar et al. | 362/284 |
| 7,168,826 | B2 * | 1/2007 | Imade | 362/268 |
| 7,651,227 | B2 * | 1/2010 | Penn et al. | 353/102 |
| 2007/0147065 | A1 * | 6/2007 | Nagata | 362/553 |

FOREIGN PATENT DOCUMENTS

| JP | A-06-208089 | 4/1994 |
| JP | A-2007-033576 | 2/2007 |

* cited by examiner

*Primary Examiner* — Jong-Suk (James) Lee
*Assistant Examiner* — Peggy A. Neils
(74) *Attorney, Agent, or Firm* — Oliff & Berridge, PLC

(57) ABSTRACT

A light source device adapted to generate an illumination light beam for illuminating an illuminated surface includes a light source adapted to emit a light beam, a light path conversion member adapted to rotate around an axis perpendicular to a center axis of the light beam emitted from the light source to convert a light path of the light beam emitted from the light source, an overlapping illumination element adapted to overlap a light beam emitted from the light path conversion member on the illuminated surface, the overlapping illumination element having an entrance position of the light bream input to the overlapping illumination element varies with time, and a rotating section adapted to rotate the light path conversion member.

16 Claims, 9 Drawing Sheets

LIGHT SOURCE DEVICE AND PROJECTOR

BACKGROUND

1. Technical Field

The present invention relates to a light source device and a projector.

2. Related Art

In recent years, while demands for downsizing of projectors are growing, in accordance with increase in output power of semiconductor lasers and appearance of blue semiconductor lasers, projectors using laser sources have been developed. The projectors of this kind are capable of having a sufficiently large color reproduction range because the wavelength band of the light source is narrow, and also capable of downsizing and reducing the number of components, and consequently, have a great potential as display devices of the next generation.

However, in the projectors using the laser sources, there are some cases in which a phenomenon so called "scintillation (or "speckle")" is caused, when performing display with image light. In the scintillation, interference of light is caused on scatterer such as a screen, which distributes bright points and dark points in a stripe manner or a variegated manner.

The scintillation causes the observer to have a dazzling feeling, and becomes a cause of exerting an adverse influence on the observer such as an uncomfortable feeling when appreciating images. In particular, the laser beams, which are light beams with high coherence, are apt to cause the scintillation. However, in recent years, even the lamp light sources have been getting higher coherency with shorter arc, and therefore, technologies for removing the scintillation have been getting important, and technologies for reducing the speckle noise have been proposed (see, e.g., JP-A-6-20809 (hereinafter referred to as Document 1) and JP-A-2007-33576 (hereinafter referred to as Document 2)).

In the display described in the Document 1, red laser beam, green laser beam, and blue laser beam are composed, and transmitted through a diffusion element rotated. On this occasion, reduction of the speckle noise can be achieved by rotating the diffusion element at a sufficiently high speed.

Further, the illumination device described in the Document 2 is provided with a light source device for emitting a light beam and a diffracting optical element for equalizing the illumination distribution of the incident light. Thus, the diffracting optical element executes rectangular conversion on the light emitted from the light source device to illuminating a predetermined illumination area. In a projecting image display device using this illumination device, a light valve is disposed so as to be opposed to the diffracting optical element to irradiate the light valve with the diffracted light generated by the diffracting optical element.

In the related art described above, there remains the following problem unsolved.

Specifically, in the display described in the Document 1, since the diffusion plate diffuses the light, efficiency of the light problematically drops.

Further, in the illumination device described in the Document 2, although the diffracting optical element generates the illumination light for illuminating the predetermined illumination area, there are some cases in which high-frequency noise is caused in the illumination light generated by the diffracting optical element. In such cases, it is difficult for the diffracting optical element to generate the illumination light with an even intensity distribution.

SUMMARY

The invention has an advantage of providing a light source device and a projector achieving the even intensity distribution, and capable of reducing the speckle noise while improving the light efficiency.

In order for obtaining the above advantage, the invention provides the following measures.

A light source device according to an aspect of the invention is a light source device adapted to generate an illumination light beam for illuminating an illuminated surface including a light source adapted to emit a light beam, a light path conversion member adapted to rotate around an axis perpendicular to a center axis of the light beam emitted from the light source to convert a light path of the light beam emitted from the light source, an overlapping illumination element adapted to overlap a light beam emitted from the light path conversion member on the illuminated surface, the overlapping illumination element having an entrance position of the light bream input to the overlapping illumination element varies with time, and a rotating section adapted to rotate the light path conversion member.

In the light source device according to this aspect of the invention, the light path of the light beam emitted from the light source is converted by the rotation of the light path conversion member, and is emitted to the overlapping illumination element. Then, the light beam input to the overlapping illumination element is overlapped to illuminate the illuminated surface.

On this occasion, since the light path conversion member is rotated by the rotating section around the axis perpendicular to the center axis of the light beam emitted from the light source, the entrance position of the light bream input to the overlapping illumination element varies with time. Thus, since the speckle pattern of the light beam emitted from the overlapping illumination element varies with time, it is integrated by the after image effect of human eyesight to provide the light beam with the speckle noise prevented from being generated. In other words, the light source device according to this aspect of the invention temporally varies the speckle pattern of the light beam emitted from the overlapping illumination element by rotating the light path conversion member without providing the diffusion plate provided in the related art. Thus, it becomes possible to illuminate the illuminated surface with the light beam having an even intensity distribution and the speckle noise prevented from being generated without lowering the light efficiency.

Further, since the light path conversion member is rotating without having a dead point (a point in which the movement is temporarily stopped), the moment causing the interference can be prevented. Therefore, it becomes possible to continuously maintain the effect of preventing the speckle like flickers (blinks in an image of the screen) with a simple configuration.

Further, since the variegated pattern of the light beam emitted from the overlapping illumination element is also varied temporally, it becomes possible to illuminate the illuminated surface with the light with the variegated pattern thus prevented.

Further, in the light source device according to this aspect of the invention, it is preferable that the light path conversion member refracts the light beam emitted from the light source, thereby converting the light path.

In the light source device according to this aspect of the invention, the light beam emitted from the light source is refracted in the light path conversion member, thus the light path of the light emitted from the light source is converted, and is emitted from the light path conversion member. In this case, since the loss of light is small compared to the case in which a reflecting section is provided to reflect the light beam, thus converting the light path, for example, it becomes possible to improve the efficiency of the light beam emitted from the light source.

Further, in the light source device according to this aspect of the invention, it is preferable that the light path conversion member has a prism shape, and the number of sides of the light path conversion member is an even number.

In the light source device according to this aspect on the invention, since the light path conversion member has a prism shape and the number of the sides of the light path conversion member is an even number, in the case in which the light beam input to an arbitrary surface of the light path conversion member is emitted from another surface, the light beam input to the light path conversion member and the light beam emitted from the light path conversion member can be parallel to each other. In other words, since the optical system from the light source to the overlapping illumination element can be formed as a linear system, it becomes easy to assemble the entire device.

Further, in the light source device according to this aspect of the invention, it is preferable that the light path conversion member has a quadrangular prism shape, and assuming that a length of the side of the light path conversion member is A, a refractive index of the light path conversion member is n, and the light beam proceeding towards the rotational center axis of the light path conversion member is a reference light beam, the light beam is input in a range within a distance h satisfying the following formula (1) from the reference light beam.

$$h < \frac{A}{\cos(\sin^{-1} 1/(\sqrt{2} \cdot n))} \times \sin(\frac{\pi}{4} - \sin^{-1} 1/(\sqrt{2} \cdot n)) \quad (1)$$

In the light source device according to this aspect of the invention, by inputting the light beam in the range within the distance h satisfying the formula (1) from the reference light beam, it becomes possible to make the light beam input to the light path conversion member and the light beam emitted from the light path conversion member parallel to each other.

Further, in the light source device according to this aspect of the invention, it is preferable that the light path conversion member has a regular quadrangular prism shape.

In the light source device according to this aspect of the invention, since the light path conversion member has the regular quadrangular prism shape, it becomes possible that the value h satisfying the formula (1) described above takes the largest value. Thus, the freedom of the layout of the light source with respect to the light path conversion member increases, and accordingly, it becomes easy to assemble the entire device.

Further, in the light source device according to this aspect of the invention, it is preferable that the overlapping illumination element is a holographic optical element.

In the light source device according to this aspect of the invention, the overlapping illumination element is the holographic optical element, and as the holographic optical element, a Computer Generated Hologram (hereinafter referred to as CGH) obtained by forming a relief structure calculated by a computer and formed artificially on the glass substrate, for example, can be used. This CGH is a wavefront conversion element for converting the wavefront of the incident light beam utilizing the diffraction phenomenon. In particular, the phase modulating CGH can execute the wavefront conversion with only little energy loss of the incident light wave. As described above, since the CGH can generate an even intensity distribution or an intensity distribution with a simple form, the CGH can preferably be used for the light source device. Further, the CGH allows free setting of the divisional areas of the diffraction grating, and preferably causes no aberration problems.

Further, in the case in which the overlapping illumination element is a holographic optical element, there are some cases in which a plurality of high-frequency components are generated in the illumination light beam generated by the holographic optical element. Therefore, by rotating the light path conversion member to temporally vary the entrance position of the light beam input to the holographic optical element, it becomes possible to illuminate the illuminated surface with the light beam with an even intensity distribution even in the case in which high-frequency noise is generated.

Further, in the light source device according to this aspect of the invention, it is preferable that the holographic optical element is disposed so that an imaging surface of a reproduction image by the holographic optical element becomes the illuminated surface.

In the light source device according to this aspect of the invention, since the holographic optical element is disposed so that the imaging surface of the reproduction image by the holographic optical element becomes the illuminated surface, thereby overlapping the light beam with the high-frequency components on the illuminated surface, it becomes possible to efficiently reduce the speckle noise.

A projector according to another aspect of the invention includes the light source device described above, a light modulation device adapted to modulate the light beam emitted from the light source device in accordance with an image signal to form an image, and a projection section adapted to project the image formed by the light modulation device.

In the projector according to this aspect of the invention, the light beam emitted from the light source device enters the light modulation device. Then, the image formed by the light modulation device is projected by the projection device. On this occasion, since the light beam emitted from the light source device is prevented from being degraded in efficiency, has an even intensity distribution, and is formed as a light beam with the speckle noise and the variegated patterns prevented as described above, it becomes possible to project an image without a variation in luminance on the illuminated surface.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
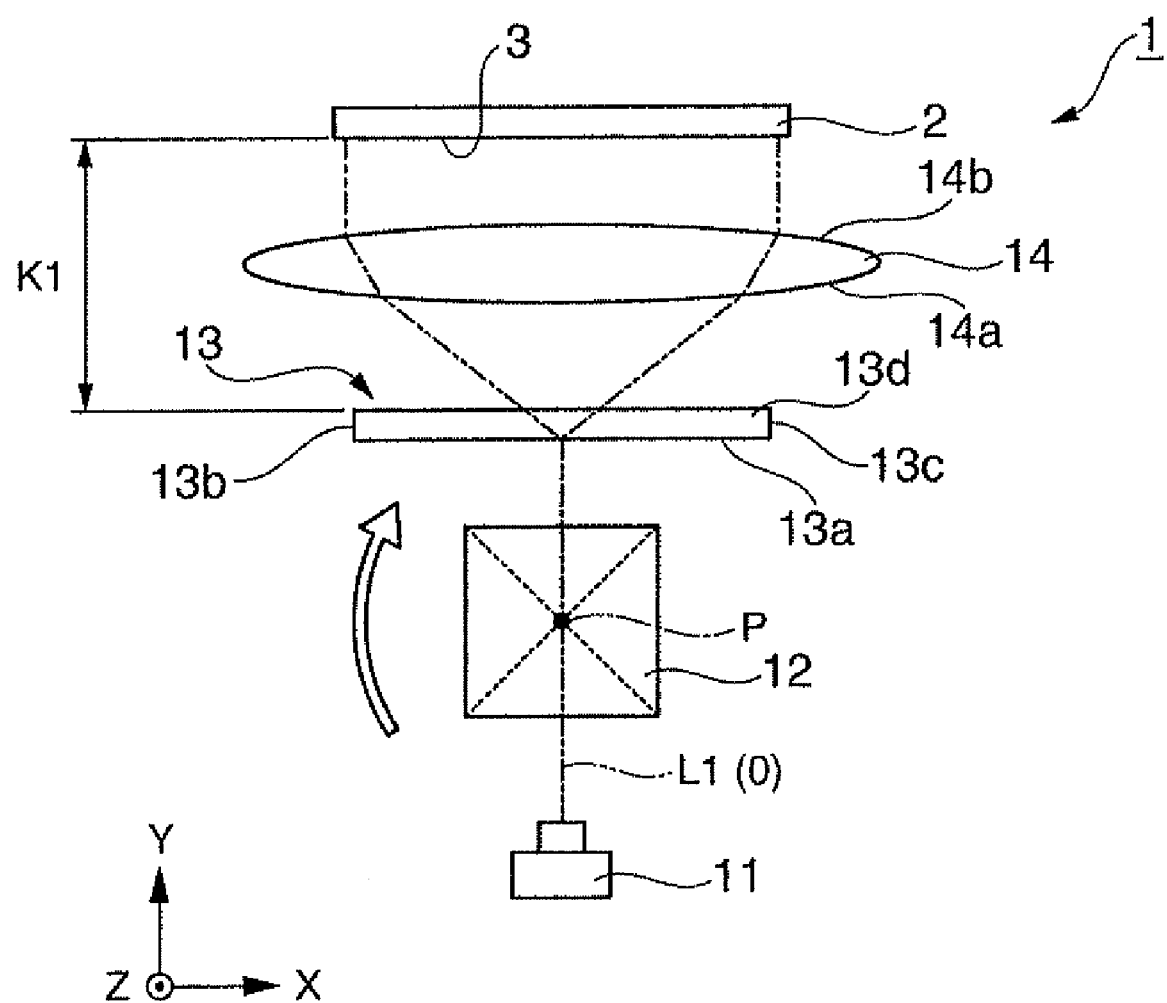
FIG. 1 is a plan view showing a light source device according to a first embodiment of the invention.

Hereinafter, some embodiments of a light source device and a projector according to the invention will be explained with reference to the accompanying drawings. It should be noted that the scale size of each member is accordingly altered so that the member is shown large enough to be recognized in the drawings below.

First Embodiment

The light source device according to a first embodiment of the invention will be explained with reference to FIGS. 1 through 5.

As shown in FIG. 1, a light source device 1 is for illuminating a illumination (illuminated) surface 3 of an illumination target 2, and is provided with a laser source (a light source) 11 for emitting a laser beam, a rod member (a light path conversion member) 12, a holographic optical element 13, and a refractor 14.

It is assumed that the center axis of the light beam emitted from the laser source 11 is a Y-axis, an axis directed from a left end 13b of the holographic optical element 13 described later to a right end 13c thereof is an X-axis, and an axis directed from a lower end 13e of the holographic optical element 13 to an upper end 13d thereof is a Z-axis.

The rod member 12 is a regular quadrangular prism made of a glass material. The rod member 12 is disposed on the light path between the laser source 11 and the holographic optical element 13. Further, the laser beam emitted from the laser source 11 is transmitted through the rod member 12, and then enters the holographic optical element 13.

Figure 2:
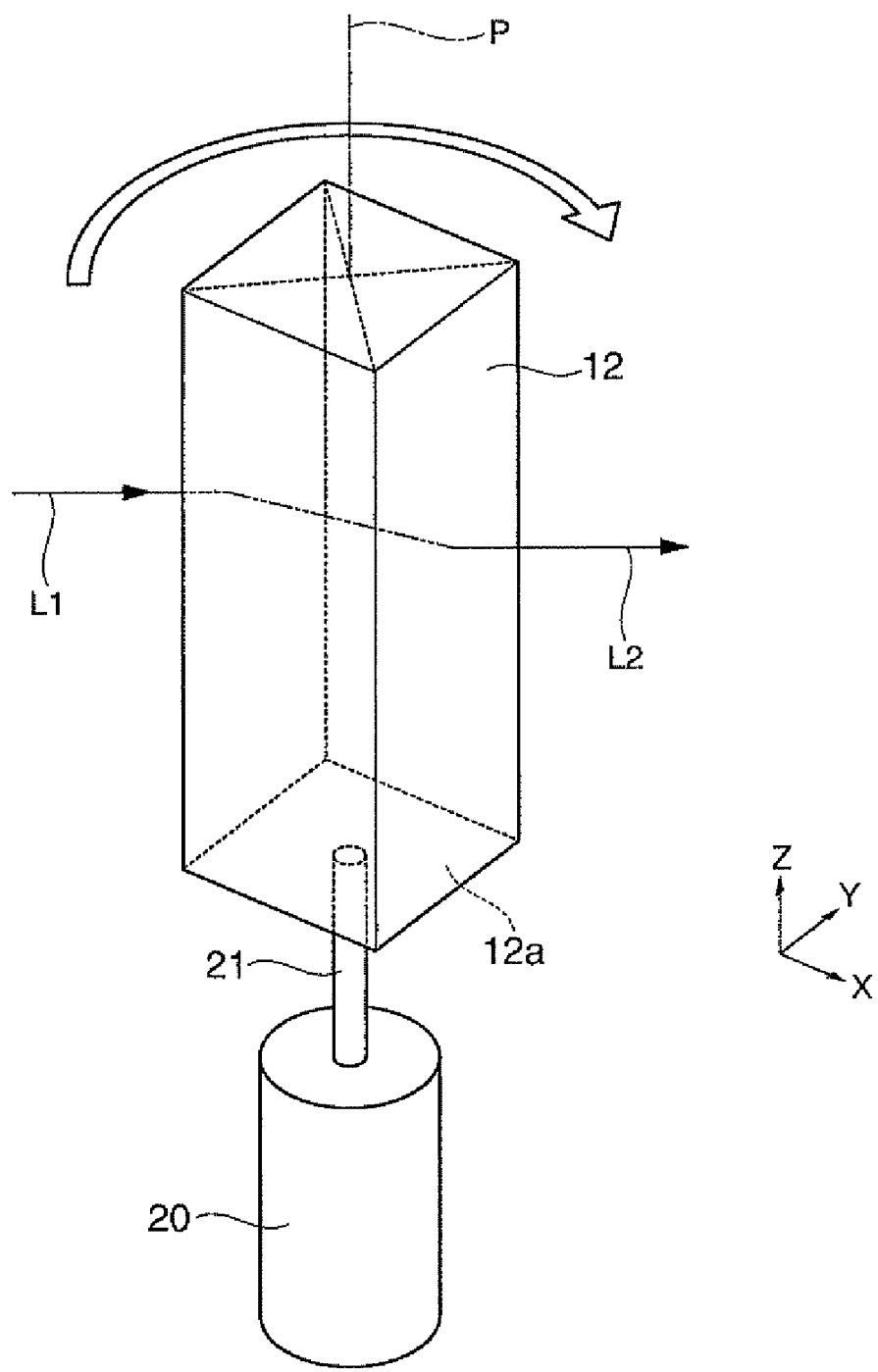
FIG. 2 is a perspective view showing a rotational state of a rod member shown in FIG. 1.

Further, the rod member 12 is arranged to be rotatable around an axis (the Z-axis) perpendicular to a center axis O of a laser beam L1 emitted from the laser source 11, namely around a rotational axis (a rotational center axis) P. Specifically, as shown in FIG. 2, the rod member 12 is arranged to be capable of being rotated by a rotating motor (a rotating section) 20r and a lower surface 12a of the rod member 12 is provided with a coupling member 21 coupled with the rotating motor 20. The coupling member 21 is attached so as to be able to rotate the rod member 12 around the rotational axis P, and the rotating motor 20 drives the rod member 12 to rotate clockwise around the rotational axis P via the coupling member 21.

Figure 3:
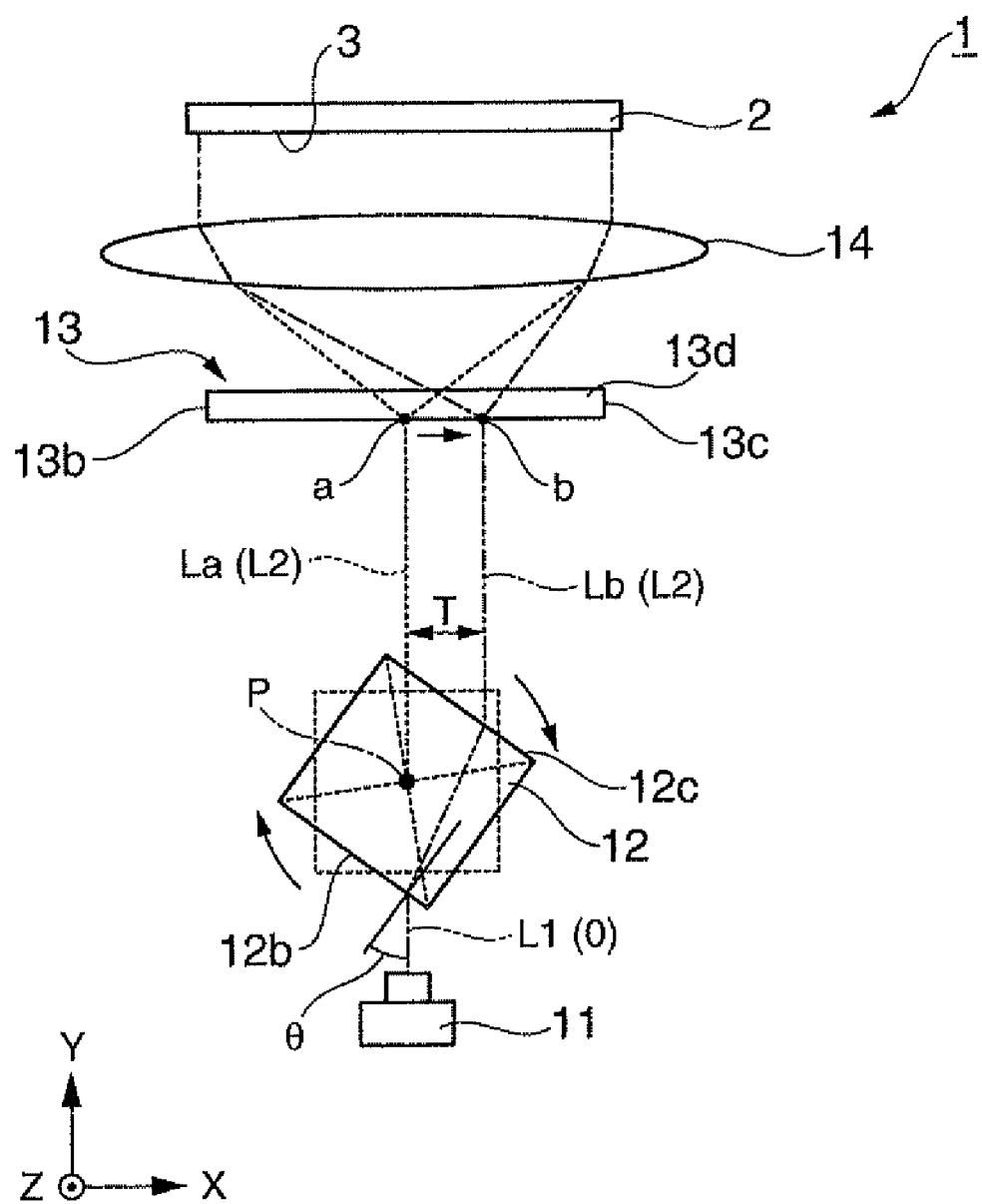
FIG. 3 is a plan view showing the rotational state of the rod member shown in FIG. 1.

The rod member 12 rotates around the Z-axis from an initial state illustrated with broken lines shown in FIG. 3 as time elapses passing through a state illustrated with solid lines shown in FIG. 3. As described above, by rotating the rod member 12, the incident angle θ of the laser beam L1 with respect to a side surface 12b varies with time, and therefore, the refraction angle of the laser beam L1 varies constantly. Thus, the position of an output beam L2 emitted from the rod member 12 varies with time. Specifically, the center axis O of the light emitted from the rod member 12 makes a parallel shift corresponding to a moving distance T from a laser beam La (illustrated with the broken lines shown in FIG. 3) to a laser beam Lb (illustrated with the double-dashed lines shown in FIG. 3). As described above, the position of the laser beam L2, which is emitted from the side surface 12b of the rod member 12 and a side surface 12c thereof opposite to the side surface 12b, varies with time.

Further, since the rod member 12 has a regular quadrangular prism shape, which is a regular polygonal prism with a cross-section composed of four (an even number) sides, when outputting the incident beam L1, which is input to the side surface 12b of the rod member 12, from the side surface 12c thereof, the output beam L2 is emitted in parallel to the incident light.

The holographic optical element (an overlapping illumination element) 13 is, as shown in FIG. 1, disposed so that the laser beam emitted from the laser source 11 enters a entrance end surface 13a perpendicularly. The holographic optical element 13 diffracts the laser beam emitted from the laser source 11 and then input from the entrance end surface 13a to generate a diffracted light beam. In other words, the holographic optical element 13 executes the rectangular conversion on the incident laser beam, thus irradiating the illumination surface 3 of the illumination target 2 with the converted laser beam.

The holographic optical element 13 is made of a material capable of transmitting the laser beam such as quartz (glass) or transparent synthetic resin. The holographic optical element 13 of the embodiment is a Computer-Generated Hologram (CGH).

The holographic optical element 13 has an illumination area setting function, an illuminance equalizing function, or an enlarged illumination function. The holographic optical element 13 having the illumination area setting function diffracts the incident light to generate a reproduction image for illuminating the illumination surface 3 of the illumination target 2. Further, the holographic optical element 13 having the illumination equalizing function equalizes illuminance of at least a part of a predetermined area. Further, the holographic optical element 13 having the enlarged illumination function illuminates the illumination surface 3 larger than the emission area where the light is emitted from the emission end surface of the holographic optical element 13. Further, the holographic optical element 13 is configured to illuminate (overlapping) the same area independent of the entrance position of the laser beam. In the present embodiment, the holographic optical element 13 overlaps the light beams, which are temporary different in the entrance position from each other, on the illumination surface 3.

Figure 4B:
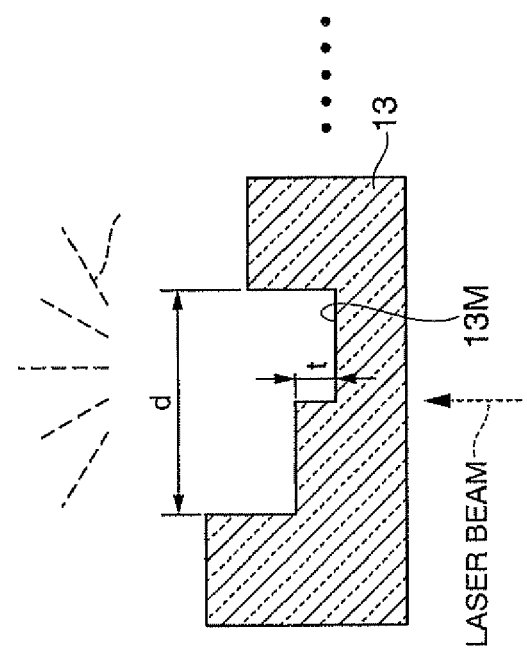
FIGS. 4A and 4B are cross-sectional views showing a substantial part of a holographic optical element shown in FIG. 1.
Figure 4A:
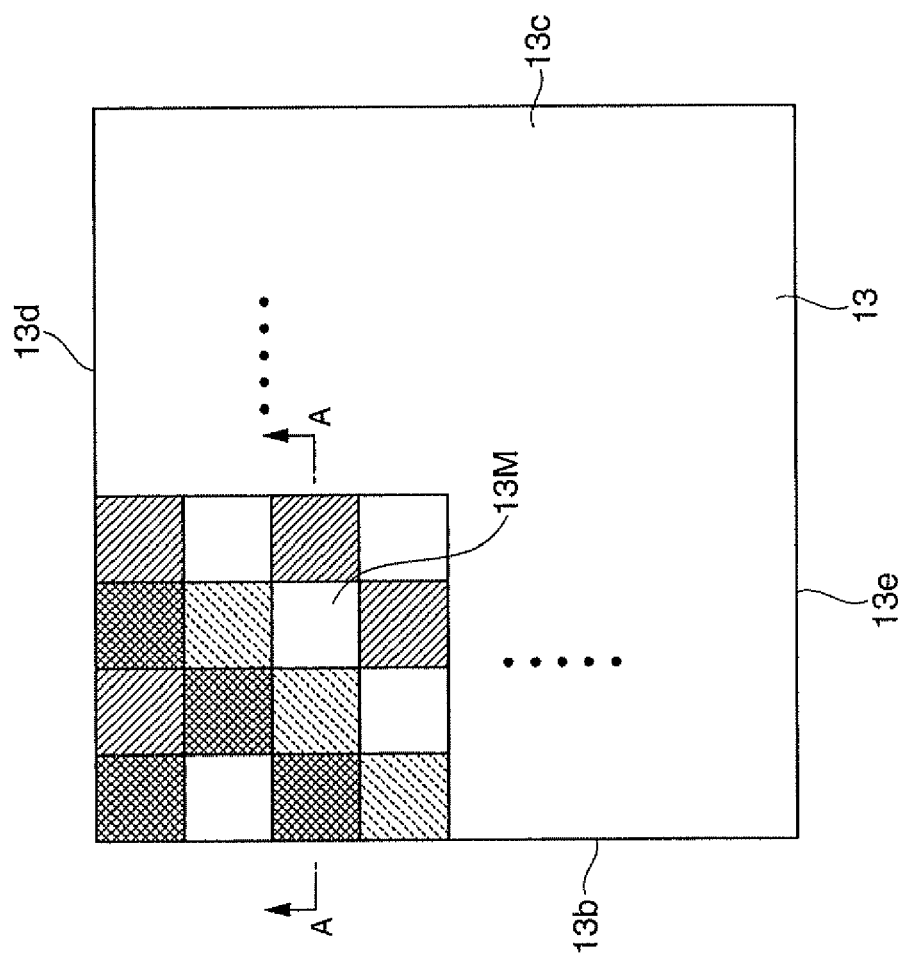

FIGS. 4A and 4B are schematic diagrams showing an example of the holographic optical element 13, wherein FIG. 4A is a plan view, and FIG. 4B is a cross-sectional view along the A-A arrowed line shown in FIG. 4A. In FIGS. 4A and 4B, the holographic optical element 13 has a plurality of rectangular concave sections (a relief structure) 13M provided on the surface thereof. The concave sections 13M have depths different from each other.

Further, by appropriately adjusting the surface conditions of the holographic optical element 13 including the pitch d between the concave sections 13M and the depths (the height of the convex section) t of the concave section 13M, it is possible to provide the predetermined functions (i.e., the illumination area setting function, a diffuse light generation function, and the enlarged illumination function) to the holographic optical element 13. As a calculation method for optimizing the surface conditions, there can be cited a predetermined operation method (a simulation method) such as an iterative Fourier transform algorism.

It should be noted that the holographic optical element 13 is not limited to what has rectangular concave sections 13M, but can also be what has a surface formed by combining planes facing to respective directions different from each other. For example, as the holographic optical element 13, a so-called blazed holographic optical element having triangular concave sections with inclined planes can also be adopted Further, as the holographic optical element 13, what has areas respectively provided with the rectangular concave sections 13M shown in FIGS. 4A and 4B, and with the triangular concave sections can also be adopted. Further, by optimizing the surface conditions, the holographic optical element 13 with a desired function can be formed.

Figure 5:
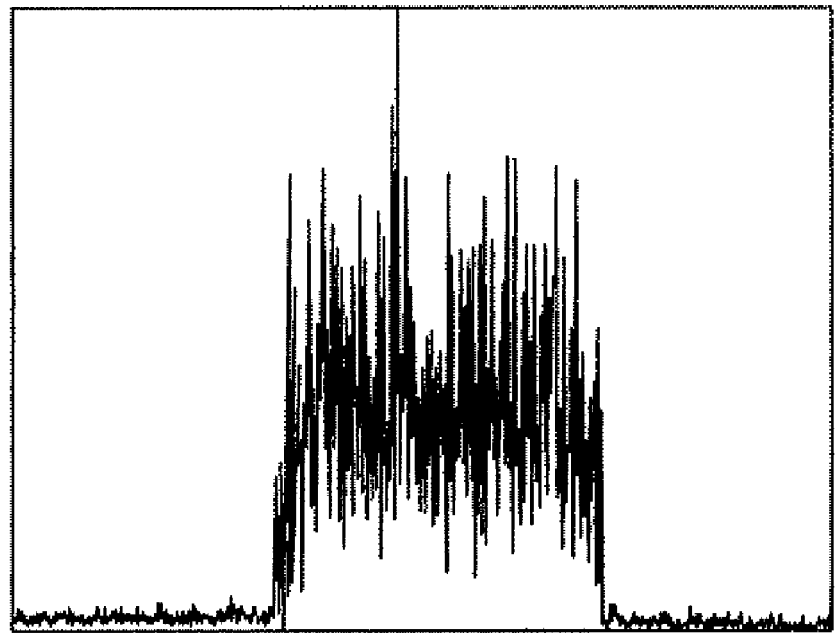
FIG. 5 is an intensity distribution of the light emitted from the holographic optical element shown in FIG. 1.

Here, when inputting the laser beam to an arbitrary position of the holographic optical element 13, the imaging surface of the reproduction image by the holographic optical element 13 forms the illumination surface 3 of the illumination target 2. When the laser beam is input to a predetermined position of the holographic optical element 13, the intensity distribution of the laser beam, which is emitted from that position, on the illumination surface 3 of the illumination target 2 becomes as shown in FIG. 5, which includes luminance spikes composed of a plurality of high-frequency components. Thus, it is difficult to form the reproduction image having an even intensity distribution using only the holographic optical element 13, and the speckle noise caused by the coherency of the laser beam is also generated.

As shown in FIG. 1, the refractor 14 adjusts the output angle of the laser beam input from an entrance end surface 14a and outputs it from an exit end surface 14b. In the present embodiment, the refractor 14 is disposed between the holographic optical element 13 and the illumination surface 3, and the laser beam emitted from the holographic optical element 13 enters the entrance end surface 14a of the refractor 14. In the present embodiment, the refractor 14 includes an axisymmetric lens of rotational symmetry with respect to the optical axis such as a spherical lens or an aspherical lens. Alternatively, the refractor 14 can include a Fresnel lens. The refractor 14 can adjust the output angle of the laser beam emitted from the exit end surface 14b, namely the incident angle of the laser beam (illumination light) to the illumination surface 3.

A method of illuminating the illumination surface 3 of the illumination target 2 using the light source device 1 according to the present embodiment thus configured will now be explained.

The laser beam L1 emitted from the laser source 11 enters the rod member 12, and proceeds towards the holographic optical element 13. Then, the laser beam input to the holographic optical element 13 is diffracted, and illuminates the illumination surface 3 of the illumination target 2 in a overlapping manner.

On this occasion, the rotating motor 20 drives the rod member 12 to rotationally move around the rotational axis P. Thus, the entrance position of the laser beam, which is transmitted through the rod member 12, on the entrance end surface 13a of the holographic optical element 13 varies with time in accordance with the rotation of the rod member 12. Specifically, as shown in FIG. 3, the position of the light beam emitted from the rod member 12 and input to the holographic optical element 13 is moved continuously from a point "a" to a point "b" of the holographic optical element 13 in a direction from the left end 13b to the right end 13c. Further, in the case in which the point "b" is the terminal position of the laser beam input to the holographic optical element 13, the laser beam returns to the point "a" after reaching the point "b" of the holographic optical element 13, and then moves again from the point "a" to the point "b" continuously.

As described above, when the entrance position of the laser beam input to the holographic optical element 13 moves from the point "a" to the point "b," the pattern of the reproduction image varies in accordance with the entrance position. Further, since the pattern of the luminance spikes is also varied corresponding to the pattern of the reproduction image varying with time, the laser beams with different patterns of the luminance spikes are overlapped with time to illuminate the illumination surface 3 of the illumination target 2.

As described above, in the light source device 1 according to the present embodiment, since the entrance position of the laser beam input to the holographic optical element 13 is varied by rotating the rod member 12, the luminance spikes of the reproduction image pattern varying with time are temporally overlapped. Thus, the speckle pattern of the laser beam emitted from the holographic optical element 13 varies with time. Further, the speckle pattern is integrated with the afterimage effect of human eyesight, thus the light with suppressed speckle noise can be obtained. In other words, the light source device 1 according to the present embodiment temporally varies the speckle pattern of the light beam emitted from the holographic optical element 13 by rotating the rod member 12 without providing the diffusion plate provided in the related art. Thus, it becomes possible to illuminate the illumination surface 3 of the illumination target 2 with the light beam with the even intensity distribution of the reproduction image generated by the holographic optical element 13 and the suppressed speckle noise without degrading the light efficiency.

Further, since the rod member 12 is rotating without having a dead point (a point in which the movement is temporarily stopped), the moment causing the interference can be prevented. Therefore, it becomes possible to continuously maintain the effect of preventing the speckle like flickers (blinks in an image of the screen) with a simple configuration.

Further, since the variegated pattern of the light emitted from the holographic optical element 13 is also varied temporally, the light with the variegated pattern thus prevented can be obtained.

In other words, the light source device 1 according to the present embodiment is capable of providing an even intensity distribution, and reducing the speckle noise while improving the light efficiency.

Further, since the rod member 12 has a regular quadrangular prism shape, which is a regular polygonal prism with a cross-section composed of four (an even number) sides, when outputting the light, which is input to the side surface 12b of the rod member 12, from the side surface 12c thereof facing the side surface 12b, the output light can be emitted in parallel to the light thus input. In other words, since the optical system from the laser source 11 to the holographic optical element 13 can be formed as a linear system, it becomes easy to assemble the entire device.

Further, since the rod member 12 has the regular quadrangular prism shape, it becomes possible that the value h satisfying the formula (1) described above takes the largest value. Thus, the freedom of the layout of the laser source 11 with respect to the rod member 12 increases, and accordingly, it becomes easy to assemble the entire device.

Further, the CGH used as the holographic optical element 13 can generate an even intensity distribution and an intensity distribution with a simple shape, and therefore, can preferably be used for the light source device 1. Further, the CGH allows free setting of the divisional areas of the diffraction grating, and preferably causes no aberration problems.

Further, since the holographic optical element 13 is configured to illuminate (overlapping) the same area independently of the entrance position of the laser beam, it is possible to reduce the laser beam illuminating other areas than the desired area, namely the illumination surface 3 of the illumination target 2. Therefore, it becomes possible to improve the efficiency of the laser beam emitted from the laser source 11.

It should be noted that although the regular quadrangular prism is used as the rod member 12 in the present embodiment, a quadrangular prism can also be used. Further, in the case in which the quadrangular prism is used, it becomes easier to emit the output light in parallel to the incident light with the configuration in which the planes thereof facing each other are parallel to each other.

Further, although the rod member 12 is rotated around the rotational axis P to move the laser beam L1 emitted from the laser source 11 from the left end 13b to the right end 13c on the holographic optical element 13, it is sufficient for the rod member 12 to be rotated around an axis perpendicular to the center axis O of the laser beam. For example, the rod member 12 can be rotated around the X-axis. In this configuration, since the rod member 12 moves the entrance position of the laser beam input from the laser source 11 from the upper end 13d to the lower end 13e on the holographic optical element 13, the same effect as in the case described above can be obtained. Further, although the rod member is rotated clockwise in the present embodiment, a counterclockwise direction can also be adopted.

Still further, the refractor 14 can be eliminated. Further, although the rotating motor 20 is used as the rotating section, the rotating section is not thereto, but can be any section capable of rotating the rod member 12.

Second Embodiment

A second embodiment according to the invention will now be explained with reference to FIGS. 6A and 6B. It should be noted that in the drawing of each of the embodiments described hereinafter, portions with configurations common to the light source device 1 according to the first embodiment described above will be denoted with the same reference numerals, and the explanations therefor will be omitted.

The light source device according to the present embodiment is different from that of the first embodiment in that the entrance range of the laser beam input from the side surface 12b of the rod member 12 is regulated. The other configurations are the same as those of the first embodiment.

There are caused some cases in which the incident beam L1 and the output beam L2 are not parallel to each other depending on the position of the rod member 12 where the laser beam emitted from the laser source 11 is input.

Figure 6A:
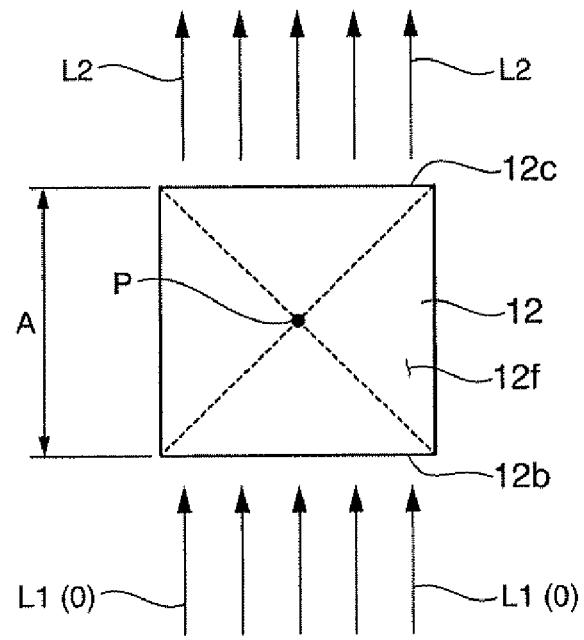
FIGS. 6A and 6B are explanatory diagrams showing a light source device according to a second embodiment of the invention.

Firstly, as shown in FIG. 6A, in the case in which the rod member 12 is at the position in the initial state, since the rod member 12 is disposed so that the center axis O of the incident laser beam L1 and the side surface 12b are substantially perpendicular to each other, the output beam L2 output through the inside of the rod member 12 is parallel to the incident beam L1 independently of the position in the side surface 12b where the laser beam L1 enters.

Figure 6B:
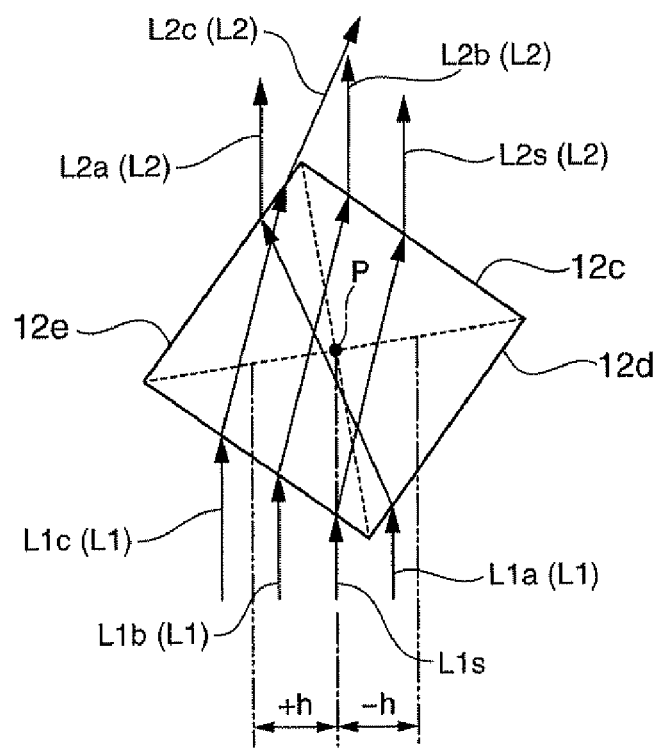

Then, as shown in FIG. 6B, in the state in which the rod member 12 is rotated around the rotational axis P, there are cases in which the laser beam L1 thus input is parallel to the output beam L2 and the cases in which it is not parallel to the output beam L2 depending on the position in the rod member 12 where the laser beam L1 is input. Here, a laser beam L1s proceeds towards the rotational axis P of the rod member 12 is defined as a reference.

Firstly, when the laser beam L1s as a reference is input to the rod member 12, a laser beam L2s substantially parallel to the laser beam L1s is emitted from the side surface 12c opposite to the side surface 12b.

Then, when a laser beam L1a is input from the position distant rightward from the position where the reference laser beam L1s is input, namely the laser beam L1a is input from a side surface 12d of the rod member 12 in the state shown in FIG. 6B, a laser beam L2a substantially parallel to the laser beam L1a is emitted from a side surface 12e opposite to the side surface 12d. Similarly, when a laser beam L1b is input from the position distant leftward from the position where the reference laser beam L1s is input, namely the laser beam L1b is input from the side surface 12b of the rod member 12, a laser beam L2b substantially parallel to the laser beam L1b is emitted from the side surface 12c opposite to the side surface 12b.

On the other hand, when a laser beam L1c is input from the position distant further leftward from the position where the laser beam L1b is input, namely the laser beam L1c is input from the side surface 12b of the rod member 12, a laser beam L2c not parallel to the laser beam L1c is emitted from the side surface 12e perpendicular to the side surface 12b.

Therefore, as shown in FIG. 6A, assuming that the length of each side of a top surface 12f of the rod member 12 is A, and the refractive index of the rod member 12 is n, it is necessary to input the laser beam within a range in which the distance h from the entrance position of the reference laser beam L1s satisfies the following formula (1) in order for making the laser beam L1 input to the rod member 12 and the laser beam L2 emitted therefrom parallel to each other.

$$h < \frac{A}{\cos(\sin^{-1}1/(\sqrt{2}\cdot n))} \times \sin(\frac{\pi}{4} - \sin^{-1}1/(\sqrt{2}\cdot n)) \quad (1)$$

Specifically, when A=20 mm, n=1.46 is provided, h becomes 6.3 mm, and therefore, in order for making the laser beam L1 input to the rod member 12 and the laser beam L2 emitted therefrom parallel to each other, the light beam emitted from the laser source 11 is input to the rod member 12 within 6.3 mm leftward and rightward from the entrance position of the reference laser beam L1s.

In the light source device according to the present embodiment, the same advantage as in the light source device 1 according to the first embodiment can be obtained. Further, in the light source device according to the present embodiment, by disposing the laser source 11 at the position satisfying the formula (1) described above to input the laser beam to the rod member 12, it becomes possible to surely make the laser beam L1 input to the rod member 12 and the laser beam L2 emitted therefrom parallel to each other. Specifically, in the case in which the laser beam L1 input to the rod member 12 and the laser beam L2 emitted therefrom are not parallel to each other, there are caused a laser beam not input to the holographic optical element 13 and a laser beam input to the entrance end surface 13a at an angle other than the right angle with the entrance end surface 13a, and thus the light efficiency is lowered. However, in the present embodiment, since the laser beam L1 input to the rod member 12 and the laser beam L2 emitted therefrom can be made substantially parallel to each other, the substantially entire laser beam emitted from the laser source 11 can be input to the entrance end surface 13a of the holographic optical element 13 in a perpendicular manner. Therefore, it becomes possible to improve the efficiency of the laser beam emitted from the laser source 11.

Further, if the laser beam is input outside the range in which the formula (1) is satisfied, the range of the continuously varying entrance position of the laser beam input to the holographic optical element 13 shown in the first embodiment is narrowed. Thus, since a limited number of patterns of the reproduction image by the holographic element 13 can only be obtained, the effect of reducing the speckle noise is weak.

Therefore, by inputting the laser beam within the range in which the formula (1) is satisfied, the range of the continuously varying entrance position of the laser beam output from the rod member 12 and input to the holographic optical element 13 becomes wider. Thus, the luminance spikes of more patterns of the reproduction images are generated in accordance with the entrance position of the light beam input to the holographic optical element 13. Therefore, it becomes possible to illuminate the illumination surface 3 of the illumination target 2 with the light beam with the even intensity distribution of the reproduction image generated by the holographic optical element 13 and the suppressed speckle noise.

Further, although the rod member 12 is not limited to the quadrangular prism but can be a hexagonal prism, the fewer number of sides is more preferable, and the incident light beam L1 and the output light beam L2 are preferably parallel to each other. In order for satisfying these requirements, the rod member 12 with the regular quadrangular prism shape is the most preferable, with which the widest range ±h of the entrance position of the laser beam input to the side surfaces 12b through 12e of the rod member 12 can be obtained.

Third Embodiment

A third embodiment according to the invention will now be explained with reference to FIGS. 7A, 7B, and 8.

In the present embodiment, the case in which the holographic element 13 is disposed so that the imaging surface of the reproduction image by the holographic optical element 13 becomes the illumination surface 3 of the illumination target 2 as described in the first embodiment will be explained.

Figure 7A:
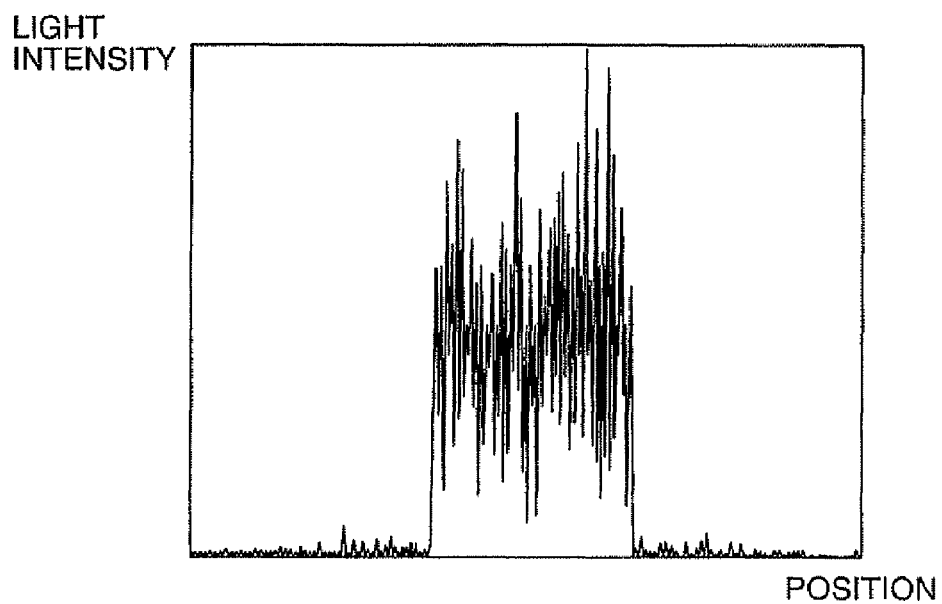
FIGS. 7A and 7B are explanatory diagrams showing an intensity distribution of the light emitted from a holographic optical element of a light source device according to a third embodiment of the invention.

The cross-sectional diagram of the intensity distribution in the illumination surface 3 of the illumination target 2 has the luminance spikes composed of a large number of high-frequency components as shown in FIG. 7A.

Figure 7B:
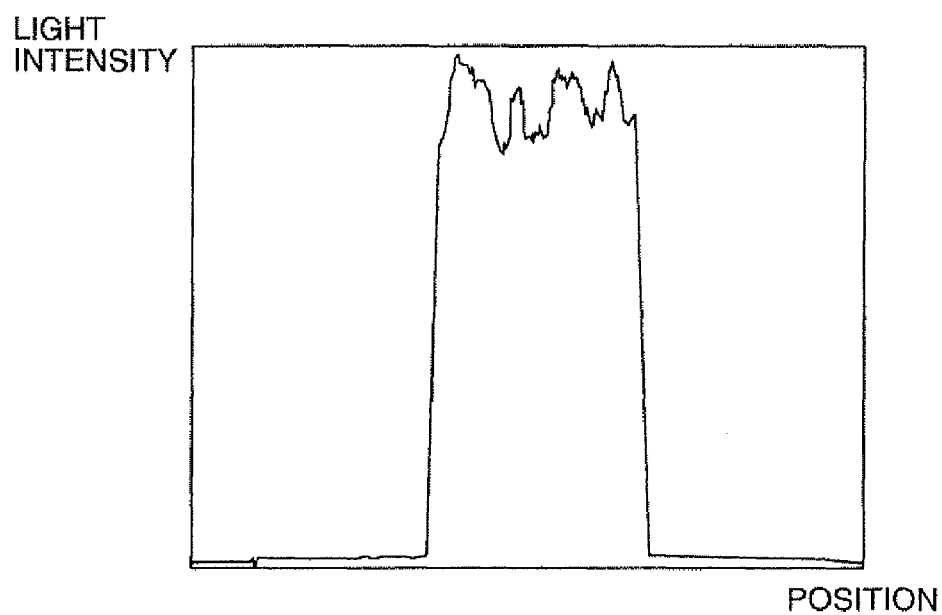
Figure 8:
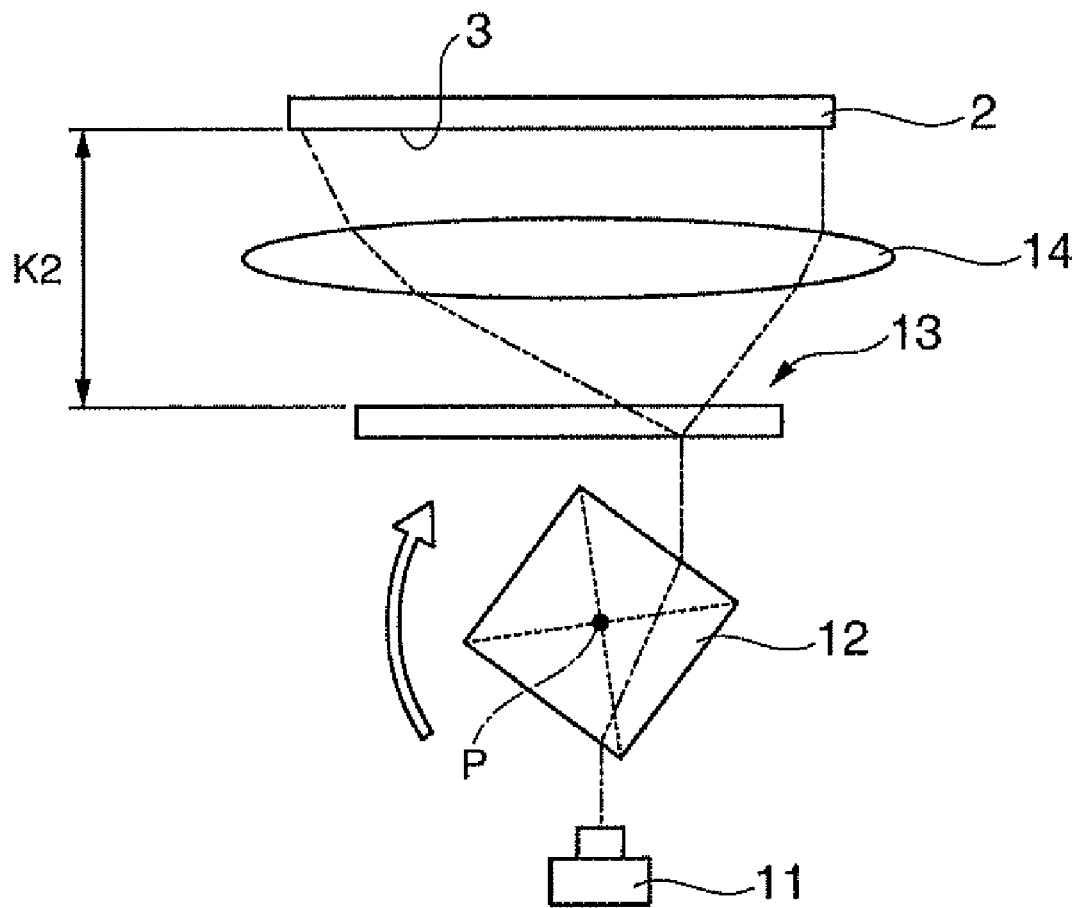
FIG. 8 is a plan view showing a light source device having the intensity distribution shown in FIG. 7B.

In contrast, in the case in which the imaging surface of the reproduction image by the holographic optical element 13 is different from the illumination surface 3 of the illumination target 2, namely, as shown in FIG. 8, the distance K2 between the holographic optical element 13 and the illumination target 2 is different from the distance K1 between the holographic optical element 13 and the illumination target 2 shown in FIG. 1, the cross-sectional view of the intensity distribution in the illumination surface 3 of the illumination target 2 includes very few luminance spikes composed of the high-frequency components as shown in FIG. 7B, and it is difficult to generate such luminance spikes composed of the high-frequency components as shown in FIG. 7A. Therefore, if the imaging surface of the reproduction image by the holographic optical element 13 becomes out of the illumination surface 3 of the illumination target 2, the laser beam emitted from the holographic optical element 13 includes only few high-frequency components as shown in FIG. 7B to have a larger distance between the luminance spikes, and therefore, it is difficult to reduce the speckle noise. Therefore, by disposing the holographic optical element 13 so that the imaging surface of the reproduction image by the holographic optical element 13 becomes the illumination surface 3 of the illumination target 2, the laser beams with the luminance spikes composed of high-frequency components overlap with each other on the illumination surface 3, thus it becomes possible to efficiently reduce the speckle noise.

In the light source device according to the present embodiment, since the reproduction image by the holographic optical element 13 has the illumination surface 3 of the illumination target 2 as the imaging surface, the illumination surface 3 of the illumination target 2 is illuminated with the laser beam obtained by overlapping the luminance spikes composed of a large number of high-frequency components of the pattern of the reproduction image varying with time. Therefore, it becomes possible to reduce the speckle noise to the extent unnoticeable with human eyesight. In other words, the distance between the holographic optical element 13 and the illumination surface 3 of the illumination target 2 is adjusted so that the imaging surface of the reproduction image by the holographic optical element 13 becomes the illumination surface 3 of the illumination target 2. Thus, it becomes possible to efficiently reduce the speckle noise.

As described above, in each of the embodiments described above, it is preferable that the holographic optical element 13 is disposed so that the imaging surface of the reproduction image by the holographic optical element 13 becomes the illumination surface 3 of the illumination target 2.

Fourth Embodiment

A fourth embodiment will hereinafter be described. In the present embodiment, an example of a projector applying the light source device 1 as described in each of the embodiments described above will be explained.

Figure 9:
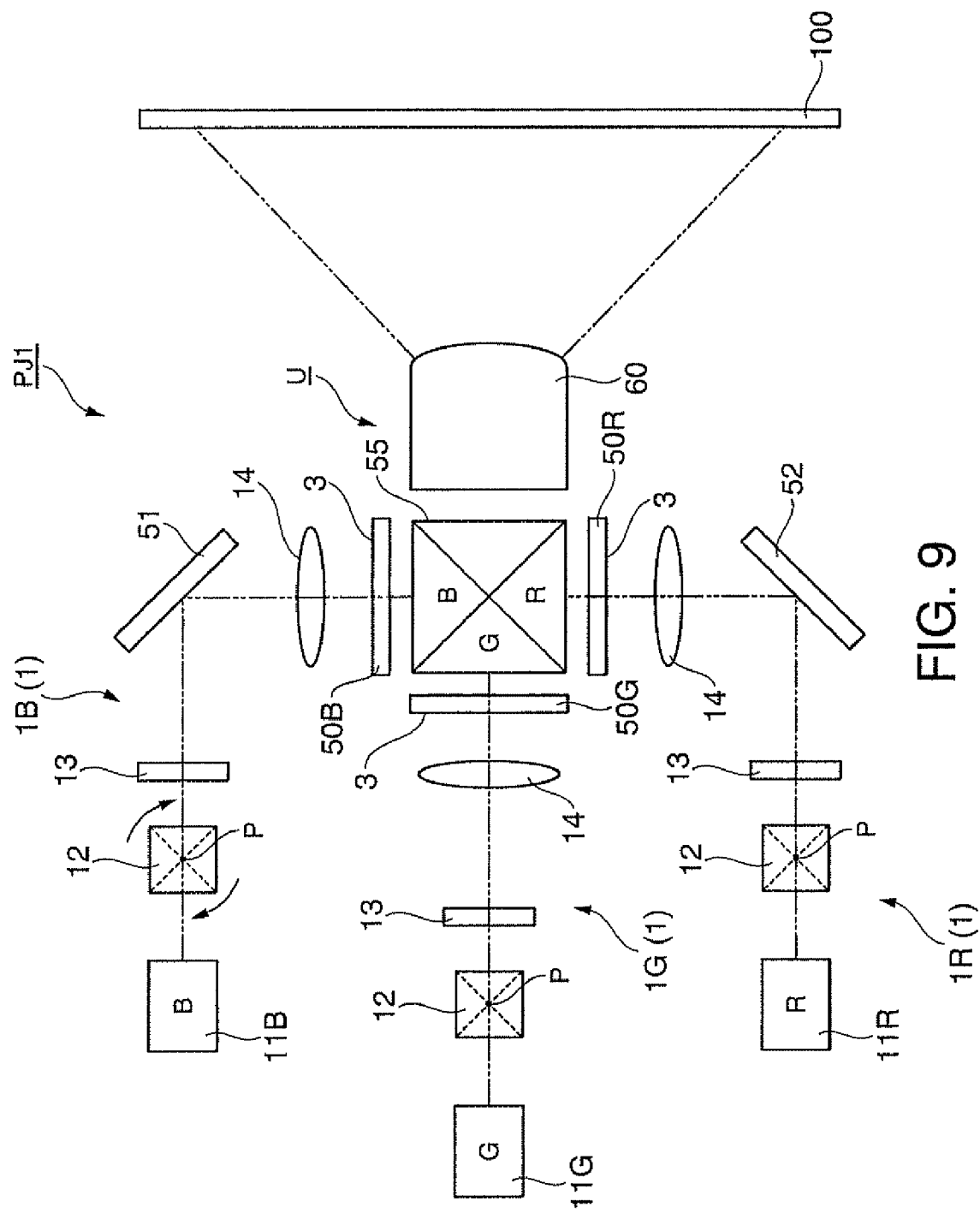
FIG. 9 is a schematic configuration diagram showing a projector according to a first embodiment of the invention.

FIG. 9 is a schematic configuration diagram showing the projector equipped with the light source devices 1 (1R, 1G, and 1B) described in the first embodiment described above. In the present embodiment, as the projector, a projection type projector PJ1 for projecting colored light beams including image information generated by a spatial light modulation device on a screen via a projection system is exemplified and explained.

The projection type projector PJ1 is provided with a projection unit U for projecting the light beams including the image information on the screen 100 (the display surface) as shown in FIG. 9. By projecting the light beam from the projection unit U on to the screen 100, the image is formed on the screen 100. The projection type projector PJ1 of the present embodiment has the screen 100 as a reflective screen, and projects the light beam including the image information on the screen 100 from the front side of the screen 100.

The projection unit U is provided with a first light source device 1R capable of illuminating the illumination surface 3 with a first fundamental colored light (red light), a second light source device 1G capable of illuminating the illumination surface 3 with a second fundamental colored light (green light), and a third light source device LB capable of illuminating the illumination surface 3 with a third fundamental colored light (blue light).

As shown in FIG. 9, the first, second, and third light source devices 1 (1R, 1G, 1B) are provided with a red laser source (light source) 11R for emitting red light, a green laser source (light source) 11G for emitting green light, and a blue laser source (light source) 11B for emitting blue light, respectively, and each have the rod member 12, the holographic optical element 13, and the refractor 14 similar to those in the first embodiment.

Further, the blue light emitted from the holographic optical element 13 of the third light source device 1B has a light path folded 90° by a mirror 51, and then enters the refractor 14. Similarly, the red light emitted from the holographic optical element 13 of the first light source device 1R has a light path folded 90° by a mirror 52, and then enters the refractor 14.

Further, the projection unit U is provided with a first spatial light modulation device (a light modulation device) 50R having an entrance surface (an illuminated surface) 3 illuminated by the first light source device 1R and for executing light modulation on the illumination light in accordance with the image information, a second spatial light modulation device (a light modulation device) 50G having an entrance surface (an illuminated surface) 3 illuminated by the second light source device 1G and for executing light modulation on the illumination light in accordance with the image information, a third spatial light modulation device (a light modulation device) 50B having an entrance surface (an illuminated surface) 3 illuminated by the third light source device 1B and for executing light modulation on the illumination light in accordance with the image information, a dichroic prism (a color composition section) 55 for composing the respective fundamental colored light beams modulated by the respective spatial light modulation devices 50R, 50G, and 50B, and a projection system (a projection section) 60 for projecting the light beam generated by the dichroic prism 55 on the screen 100. Each of the spatial light modulation devices 50R, 50G, and 50B is configured including a liquid crystal device. In the explanations described below, the spatial light modulation device is also referred to as a light valve, if appropriate.

Further, the rod member 12 provided to each of the first, second, and third light source devices 1R, 1G, and 1B is rotated around the rotational axis P by a rotating motor (not shown). Further, in accordance with the rotation of the rod member 12, the entrance position in the holographic optical element 13 of the laser beam emitted from each of the laser sources 11R, 11G, and 11B is moved.

Further, as the control of the rotation of the rod member 12 by the rotating motor (not shown), control of rotating all of the rod members 12 is possible, and control of continuously rotating at least one of the rod members 12 is preferable. Thus, since at least one rod member 12 is always rotating, and therefore there is no moment when three rod members 12 stop simultaneously, it becomes possible to further effectively prevent generation of the speckle noise and variegated patterns.

The light valves 50R, 50G, and 50B are each provided with an entrance side polarization plate, a panel having a liquid crystal material encapsulated between a pair of glass substrates, and an exit side polarization plate. The glass substrate is provided with pixel electrodes and an oriented film. The light valve forming the spatial light modulation device is arranged to selectively transmit the light with a predetermined vibration direction, and light modulation is executed on the fundamental colored light input to the light valve while the fundamental colored light is transmitted through the light valve.

The fundamental colored light beams (the modulated light beams) thus modulated while being transmitted through the respective light valves 50R, 50G, and 50B are composed by the dichroic prism 55. The dichroic prism 55 is composed of four dichroic prisms, and composes the red light (R), the green light (G), and the blue light (B) into a full-color composite light beam. The full-color composite light beam emitted from the dichroic prism 55 is provided to the projection system 60. The projection system 60 projects the full-color composite light beam on the screen 100. The projection system 60 is a so-called magnifying system for magnifying the image on the entrance side thereof to project on the screen 100.

The projection unit U projects the full-color composite light beam, which includes image information obtained via the respective light valves 50R, 50G, and 50B respectively illuminated by the first, second, and third light source devices 1R, 1G, and 1B, on the screen 100 using the projection system 60, thereby forming the full-color image on the screen 100. The observer appreciates the image projected on the screen 100 by the projection unit U.

The first, second, and third light source devices 1R, 1G, and 13 respectively provide the light valves 50R, 50G, and 50B of the projector PJ1 of the present embodiment with high illuminance, and respectively illuminate the light valves 50R, 50G, and 50B with the illumination light beams in which the speckle noise and the variegated patterns are prevented from being generated to provide an even illumination distribution. Further, in the case in which the diffusing plate is used for preventing the speckle noise and the variegated patterns from being generated, the incident angle of the light beam to the light valves becomes divergent. In contrast thereto, in the projector PJ1 of the present embodiment, since it is possible to input only the light beams with the predetermined angle to the light valves 50R, 50G, and 50B using the holographic optical element 13 and the refractor 14, the projector PJ1 is capable of displaying the preferable image with high contrast.

It should be noted that the scope of the invention is not limited to the embodiments described above, but various modifications can be executed thereon within the scope or the spirit of the invention.

For example, although the dichroic prism is used as a colored light composition section, the colored light composition section is not limited thereto. As the colored light composition section, what has dichroic mirrors in a cross arrangement to compose the colored light beams, or what has dichroic mirrors arranged in parallel to each other to compose the colored light beams, and so on can be used.

Further, although the holographic optical element is exemplified and explained as the overlapping illumination element, any element adapted to overlap the incident light beams such as a fly-eye lens or a rod integrator can also be adopted.

Further, it is also possible to apply the illumination device of the embodiments described above to a so-called a slide projector, which is not provided with the liquid crystal light valve, and for example, illuminates the surface of a slide (a positive film) including image information with the illumination device to project the light including the image information on the screen.

The entire disclosure of Japanese Patent Application No. 2007-339462, filed Dec. 28, 2007 is expressly incorporated by reference herein.

What is claimed is:

1. A light source device adapted to generate an illumination light beam for illuminating an illuminated surface, comprising:
   a light source adapted to emit a light beam;
   a light path conversion member adapted to rotate around an axis perpendicular to a center axis of the light beam emitted from the light source to convert a light path of the light beam emitted from the light source;
   an overlapping illumination element adapted to overlap a light beam emitted from the light path conversion member on the illuminated surface, the overlapping illumination element having an entrance position on its surface for the light beam transmitted through the light path conversion member that varies in time in accordance with the rotation of the light path conversion member, wherein the illumination element illuminates the same area independent of the entrance position of the light beam; and
   a rotating element adapted to rotate the light path conversion member.

2. The light source device according to claim 1,
wherein the light path conversion member refracts the light beam emitted from the light source, thereby converting the light path.

3. The light source device according to claim 1,
wherein the light path conversion member has a prism shape, and
the number of sides of the light path conversion member is an even number.

4. The light source device according to claim 3,
wherein the light path conversion member has a quadrangular prism shape, and
assuming that a length of the side of the light path conversion member is A, a refractive index of the light path conversion member is n, and the light beam proceeding towards the rotational center axis of the light path conversion member is a reference light beam, the light beam is input in a range within a distance h satisfying the following formula (1) from the reference light beam $$h < \frac{A}{\cos(\sin^{-1}1/(\sqrt{2} \cdot n))} \times \sin(\frac{\pi}{4} - \sin^{-1}1/(\sqrt{2} \cdot n)). \quad (1)$$

5. The light source device according to claim 4,
wherein the light path conversion member has a regular quadrangular prism shape.

6. The light source device according to claim 1,
wherein the overlapping illumination element is a holographic optical element.

7. The light source device according to claim 5,
wherein the overlapping illumination element is a holographic optical element.

8. The light source device according to claim 6,
wherein the holographic optical element is disposed so that an imaging surface of a reproduction image by the holographic optical element becomes the illuminated surface.

9. A projector comprising:
a light source device adapted to generate an illumination light beam for illuminating an illuminated surface including
a light source adapted to emit a light beam,
a light path conversion member adapted to rotate around an axis perpendicular to a center axis of the light beam emitted from the light source to convert a light path of the light beam emitted from the light source,
an overlapping illumination element adapted to overlap a light beam emitted from the light path conversion member on the illuminated surface, the overlapping illumination element having an entrance position on its surface for the light beam transmitted through the light path conversion member that varies in time in accordance with the rotation of the light path conversion member, wherein the illumination element illuminates the same area independent of the entrance position of the light beam, and
a rotating element adapted to rotate the light path conversion member;
a light modulation device adapted to modulate the light beam emitted from the light source device in accordance with an image signal to form an image; and
a projection section adapted to project the image formed by the light modulation device.

10. The projector according to claim 9,
wherein the light path conversion member refracts the light beam emitted from the light source, thereby converting the light path.

11. The projector according to claim 9,
wherein the light path conversion member has a prism shape, and
the number of sides of the light path conversion member is an even number.

12. The projector according to claim 11,
wherein the light path conversion member has a quadrangular prism shape, and
assuming that a length of the side of the light path conversion member is A, a refractive index of the light path conversion member is n, and the light beam proceeding towards the rotational center axis of the light path conversion member is a reference light beam, the light beam is input in a range within a distance h satisfying the following formula (1) from the reference light beam $$h < \frac{A}{\cos(\sin^{-1}1/(\sqrt{2} \cdot n))} \times \sin(\frac{\pi}{4} - \sin^{-1}1/(\sqrt{2} \cdot n)). \quad (1)$$

13. The projector according to claim 12,
wherein the light path conversion member has a regular quadrangular prism shape.

14. The projector according to claim 9,
wherein the overlapping illumination element is a holographic optical element.

15. The projector according to claim 13,
wherein the overlapping illumination element is a holographic optical element.

16. The projector according to claim 14,
wherein the holographic optical element is disposed so that an imaging surface of a reproduction image by the holographic optical element becomes the illuminated surface.

* * * * *